United States Patent [19]

Kindersley et al.

[11] Patent Number: 4,556,197
[45] Date of Patent: Dec. 3, 1985

[54] BALL VALVE ASSEMBLY WITH EXPANDABLE VALVE ELEMENT

[75] Inventors: Peter G. Kindersley, Glens Falls, N.Y.; Matti O. Pyysalo, Helsinki, Finland

[73] Assignee: Neles Inc., Glens Falls, N.Y.

[21] Appl. No.: 604,682

[22] Filed: Apr. 27, 1984

[51] Int. Cl.⁴ ............................................. F16K 5/20
[52] U.S. Cl. .................................................. 251/315
[58] Field of Search ............... 251/315, 174, 175, 170; 137/468

[56] References Cited

U.S. PATENT DOCUMENTS 3,472,270 10/1969 Masheder ............................ 251/174
3,501,128 3/1970 Pool ..................................... 251/315
4,467,823 8/1984 Shaffer et al. ...................... 251/315

Primary Examiner—Martin P. Schwadron
Assistant Examiner—Sheri M. Novack
Attorney, Agent, or Firm—Cushman, Darby & Cushman

[57] ABSTRACT

A ball valve assembly includes a ball valve element having a portion of the material of the ball valve element removed to facilitate expansion of the ball valve element when subjected to heat during use while minimizing the possibility of binding; the ball valve element is installed in a valve housing that is dimensioned between its inlet and outlet relative to the external dimensions of the ball valve element so as to exert a slight degree of compression on the ball element.

1 Claim, 5 Drawing Figures

BALL VALVE ASSEMBLY WITH EXPANDABLE VALVE ELEMENT

BACKGROUND AND SUMMARY OF THE INVENTION

The present invention relates to an improved method of constructing a ball valve element and, more particularly, to a ball valve assembly which will operate reliably over a broad temperature range.

In a number of applications, ball valve elements are frequently subjected to elevated temperatures which can cause the metal valve element to expand and become jammed against its associated valve seats. This is particularly troublesome where scale deposits have built up on the ball itself or the valve seats. Attempts to turn a jammed ball element can result in stem and/or seal failure.

In addition, a phenomena has been recognized where the ball inside the valve assembly may become very much hotter than the air outside the assembly as well as much hotter than the valve housing itself as the ball valve element is not able to radiate heat as efficiently as the valve housing. As a consequence, the ball valve element will experience greater thermal expansion than does the valve housing. In some cases, particularly where the valve seats are made of metal, binding of the ball valve element may occur. To obviate this difficulty, the prior art has proposed the use of movably mounted metal seats. However, this solution suffers from the disadvantage that it is relatively expensive to manufacture and is subject to failure such as when a hard particle comes between the metal seat and the ball valve element.

Accordingly, it is an object of the present invention to provide an improved ball valve assembly where thermal expansion of the ball valve element can be accommodated without requiring a replacement of the conventional fixed valve seat.

In a preferred embodiment, the method of the present invention comprises the step of removing a portion of the material of the ball valve element along a line parallel to the through bore of the ball. With a portion of the material of the ball removed, the ball will be able to become compressed when subjected to an external force much more readily than has heretofore been possible. Further, the much greater degree of compressibility of the ball will greatly minimize binding of the ball in its associated valve housing. Moreover, by facilitating the compression of the ball, thermal expansion of the ball is significantly less likely to result in jamming of the ball between metal or other hard seats.

The foregoing and other advantages will become apparent as consideration is given to the following detailed description taken in conjunction with the accompanying drawings, in which:

DETAILED DESCRIPTION OF THE INVENTION

Figure 1:
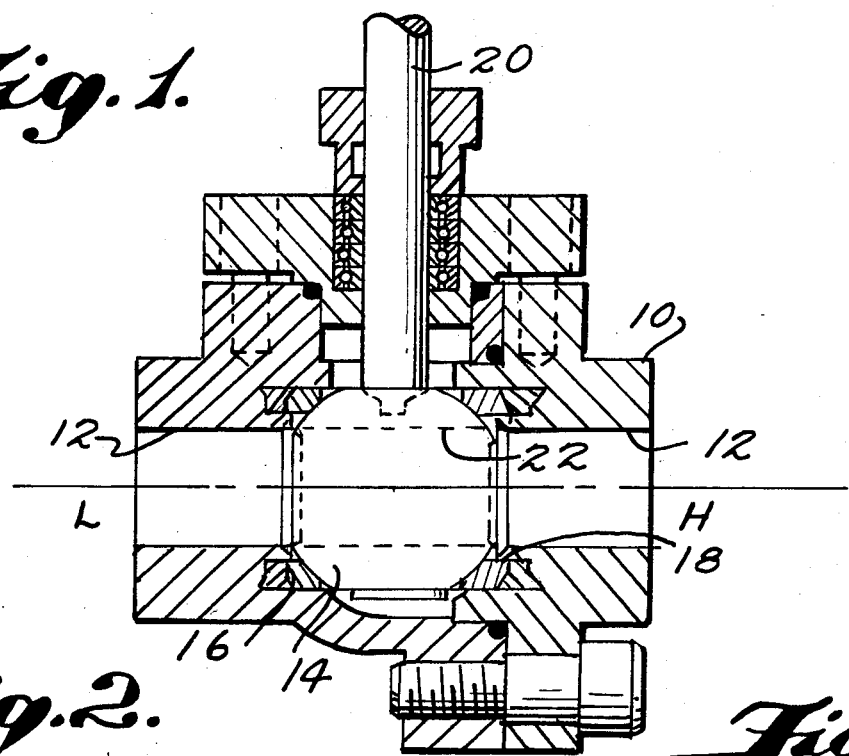
FIG. 1 is a side view in elevation of a ball valve assembly.

Referring now to the drawings wherein like numerals designate corresponding parts throughout the several views, there is shown in FIG. 1 an exemplary ball valve assembly which includes a housing 10 having a through bore 12 with the mid-section thereof occupied by a ball valve element 14. On the high pressure side H and low pressure side L of the through passage 12, annular valve seats 16 and 18 are respectively disposed and are dimensioned to form a fluid tight fit with the ball valve element 14 the surface of which is ground to match the seats 16 and 18. With the ball valve element 14 supported as illustrated, rotation of the element 14 is effected by means of a stem 20 which is disposed in a suitable sealing packing material to extend within the housing 10 to engage a slot 26 formed in the exterior surface of the ball valve 14. Rotation of the stem 20 will effect rotation of the ball valve 14 to move the through bore 22 of the ball valve 14 into and out of alignment with the through passage 12 of the housing 10. With a ball element of the present invention, the stem is not rigidly secured to the ball element.

In use, when a fluid at relatively high pressure enters the valve housing on the right hand side, the fluid will effect movement of the ball valve element 14 leftwardly as viewed in FIG. 1 to increase the sealing pressure between the surface of the ball valve element 14 and the associated annular seal 16. When the incoming fluid is at an elevated temperature, due to its enclosed nature, the ball valve element 14 can often rapidly expand its size as its temperature rises which can lead to jamming or binding of the ball valve element in place thus rendering opening and closing of the through passage 12 difficult, if not impossible.

Figure 2:
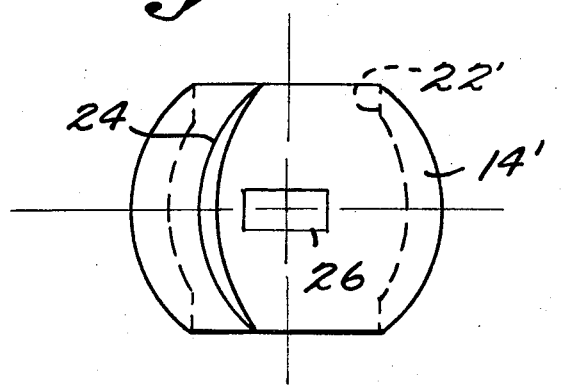
FIG. 2 is a top view of a ball valve element manufactured according to the present invention.
Figure 3:
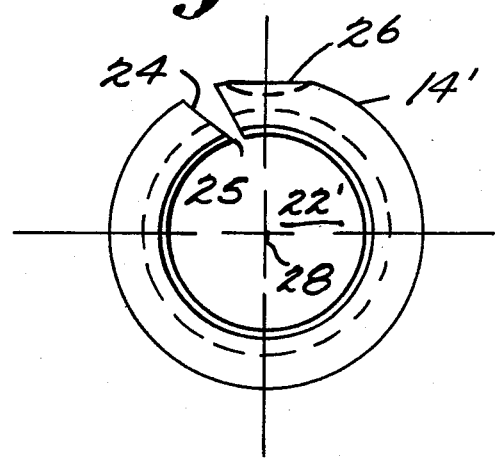
FIG. 3 is an end view in elevation of the ball valve element of FIG. 2.

To solve this difficulty, the present invention provides a ball valve element as illustrated in FIGS. 2-5. In FIGS. 2-3, a ball valve element 14' having a through bore 22' has a segment or portion removed as indicated at 24. A key socket 26 is formed in the external surface of the ball valve element 14' to receive the operative end of a stem 20. Since the stem 20 is not permanently fastened in the socket 26 of the ball valve element, manufacture of the valve is less costly. The ball element is free to flex or move without being impeded by the stem.

It will be seen that the removed segment 24 extends substantially parallel to the axis 28 of the ball element 14'. At its inner radii, the cut-out section 24 actually intersects the surface of the bore 22. The removed portion 24 is created by cutting along a straight line lying in a plane until the cutting blade passes through into the bore 22'. The second cut is made in a plane that extends at an angle to that of the first mentioned plane whereby these said two planes will intersect within said through bore 22'. The cut-out segment is therefore wedge-shaped in section the apex of the wedge extending adjacent the edge of the bore 22'.

Figure 4:
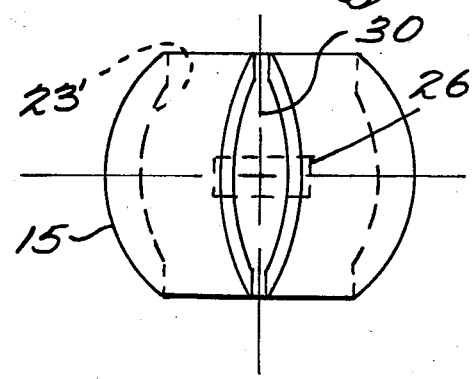
FIG. 4 is a bottom view of another embodiment of the ball valve element of the present invention.
Figure 5:
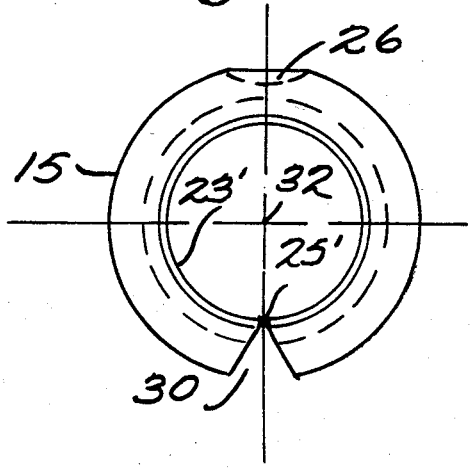
FIG. 5 is an end view of the ball valve element of FIG. 4.

With reference now to FIGS. 4 and 5, a different embodiment of the removed or cut-out segment is illustrated. In this embodiment, the cuts forming the removed portion 30 are symmetrical about an axis lying in a plane that passes through the central axis 32 of the through bore 23'. The two cuts through the surface of the ball valve element 15 each lie along a plane with these planes intersecting a common plane at substantially equal angles and with said common plane extending through the axis 32 of the bore 23'.

In each of the foregoing embodiments, it will be noted that the removed segment extends parallel to the axis of the through bore and also extends from one opening of the ball valve element to the other opening. With this arrangement, expansion of the ball when subjected to heat will be greatly facilitated while jamming or binding of the ball valve element in its housing will be avoided due to the removed segment. When the ball valve element does expand as a result of exposure to elevated temperatures, jamming is avoided due to the fact that the ball can still be compressed sufficiently to permit rotation of the ball valve element by the stem 20.

As a consequence of the compressibility of the ball valve element, the ball valve element of the present invention lends itself to use with hard valve seats of metal, ceramic or other hard synthetic materials.

In installing the ball valve element in housing 10, only a slight degree of compression or none at all is imposed on the ball element. Thus, the seals 16 or 18 will cooperate with the surface of the ball element adjacent the closed gaps to prevent leakage. Fluid pressure from the inlet forces the ball valve element into contact with the downstream valve seat.

Having described the invention, it will be apparent to those skilled in this art that various modifications may be made thereto without departing from the spirit and scope of this invention as defined in the appended claims.

What is claimed:

1. A ball valve assembly comprising a housing having an upstream inlet and a downstream outlet in axial alignment with said inlet, said outlet having valve seating means surrounding said outlet, a ball valve element disposed in said housing and having a spherical surface, a first axis, a through bore surrounding said axis, said through bore terminating at each end thereof in openings, the improvement comprising said ball valve element having means for releasably receiving a member for turning said ball valve element about a second axis that extends substantially perpendicular to said first axis, said ball valve element having exterior dimensions such that said ball valve element is movable in said housing towards said seating means without any substantial rotation of said ball valve element, said ball valve element having a portion thereof removed, said removed portion extending substantially parallel to said first axis whereby when said ball valve element is subjected to heat, said ball will expand with its surface becoming nonspherical and will exert pressure on said seating means.

* * * * *